US012297522B2

(12) United States Patent
Li et al.

(10) Patent No.: US 12,297,522 B2
(45) Date of Patent: May 13, 2025

(54) NANO-TREATMENT OF HIGH STRENGTH ALUMINUM ALLOYS FOR MANUFACTURING PROCESSES

(71) Applicant: THE REGENTS OF THE UNIVERSITY OF CALIFORNIA, Oakland, CA (US)

(72) Inventors: Xiaochun Li, Los Angeles, CA (US); Maximilian Sokoluk, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 807 days.

(21) Appl. No.: 17/287,776

(22) PCT Filed: Oct. 24, 2019

(86) PCT No.: PCT/US2019/057913
§ 371 (c)(1),
(2) Date: Apr. 22, 2021

(87) PCT Pub. No.: WO2020/154004
PCT Pub. Date: Jul. 30, 2020

(65) Prior Publication Data
US 2021/0388469 A1    Dec. 16, 2021

Related U.S. Application Data

(60) Provisional application No. 62/751,468, filed on Oct. 26, 2018.

(51) Int. Cl.
| | | |
|---|---|---|
| *C22C 21/10* | (2006.01) | |
| *B23K 31/02* | (2006.01) | |
| *B23K 35/28* | (2006.01) | |
| *C22F 1/053* | (2006.01) | |
| *B23K 103/10* | (2006.01) | |
| *B33Y 70/10* | (2020.01) | |

(52) U.S. Cl.
CPC .............. *C22C 21/10* (2013.01); *B23K 31/02* (2013.01); *B23K 35/288* (2013.01); *C22F 1/053* (2013.01); *B23K 2103/10* (2018.08); *B33Y 70/10* (2020.01)

(58) Field of Classification Search
CPC .................................. C22C 21/10; C22F 1/053
See application file for complete search history.

(56) References Cited

U.S. PATENT DOCUMENTS

| 8,434,544 B2 | 5/2013 | Fulton et al. |
| 2002/0155022 A1 | 10/2002 | Winkler et al. |
| 2013/0152739 A1 | 6/2013 | Li et al. |
| 2015/0213913 A1 | 7/2015 | Yoshida et al. |
| 2016/0175929 A1 | 6/2016 | Colin et al. |
| 2017/0204500 A1 | 7/2017 | Li et al. |
| 2018/0126456 A1 | 5/2018 | So et al. |
| 2018/0133789 A1 | 5/2018 | Martin et al. |
| 2018/0214949 A1 | 8/2018 | Martin et al. |
| 2018/0214991 A1 | 8/2018 | Yahata et al. |

FOREIGN PATENT DOCUMENTS

| EP | 3 109 332 A1 | 12/2016 |
| WO | WO-2017/173163 A1 | 10/2017 |
| WO | WO-2018/144323 A1 | 8/2018 |

OTHER PUBLICATIONS

Han, B. O., et al. "Deformation behavior of bimodal nanostructured 5083 Al alloys." Metallurgical and Materials Transactions A 36 (2005): 957-965.*
International Search Report And Written Opinion issued PTC No. US2019/57913 dated Jul. 15, 2020, p. 11.
International Preliminary Report on Patentability on PCT PCT/US2019/057913 dated May 6, 2021.
Extended Search Report on European Application No. 19912153.4 dated Sep. 16, 2022.
Office Action on Chinese Application No. 201980075843.9 dated Jan. 25, 2022.
Office Action on Chinese Application No. 201980075843.9 dated Aug. 29, 2022.
Rejection Decision on Chinese Application No. 201980075843.9 dated Mar. 10, 2023.
Sangghaleh et al., "An Investigation on the Wetting of Polycrystalline Alumina by Aluminium," Journal of Materials Processing Technology, 197 (2008), pp. 156-160.

* cited by examiner

*Primary Examiner* — Jessee R Roe
(74) *Attorney, Agent, or Firm* — Foley & Lardner LLP

(57) ABSTRACT

A metal matrix nanocomposite includes: (1) a matrix including an aluminum alloy; and (2) nanostmctures dispersed in the matrix, wherein the matrix includes grains having aspect ratios of about 3 or less. Manufacturing processes include subjecting the nanocomposite to solidification processing, fusion welding, extrusion, thixocasting, additive manufacturing, and heat treatment.

10 Claims, 8 Drawing Sheets

NANO-TREATMENT OF HIGH STRENGTH ALUMINUM ALLOYS FOR MANUFACTURING PROCESSES

CROSS-REFERENCE TO RELATED APPLICATIONS

This application is a National Stage Entry of International Application No. PCT/US2019/057913, filed Oct. 24, 2019, which claims the benefit of U.S. Provisional Application No. 62/751,468, filed Oct. 26, 2018, the contents of which are incorporated herein by reference in their entirety.

TECHNICAL FIELD

This disclosure generally relates to nanotechnology-treated (or nano-treated) aluminum (Al) alloys and manufacturing processes of such nano-treated Al alloys.

BACKGROUND

AA7075 and other Al alloys of the 7xxx series (or 7000 series), as well as Al alloys of the 2xxx series (or 2000 series), 6xxx series (or 6000 series), and 8xxx series (or 8000 series), are desirable materials for the aerospace and automobile industry because of their ultra-high specific strength and low density. However, these Al alloys are hot crack susceptible and prone to dendritic grain growth, which constrain or render impractical certain manufacturing processes using such alloys.

It is against this background that a need arose to develop the embodiments described herein.

SUMMARY

In some embodiments, a metal matrix nanocomposite includes: (1) a matrix including an aluminum alloy; and (2) nanostructures dispersed in the matrix, wherein the matrix includes grains having aspect ratios of about 3 or less.

In additional embodiments, a manufacturing process includes: (1) providing the nanocomposite of any of the foregoing embodiments; and (2) subjecting the nanocomposite to solidification processing to form a metal part.

In additional embodiments, a manufacturing process includes: (1) providing the nanocomposite of any of the foregoing embodiments as a filler material; (2) placing the filler material between metal parts of an aluminum alloy to be welded together; and (3) subjecting the metal parts with the filler material in between to fusion welding.

In additional embodiments, a manufacturing process includes: (1) providing the nanocomposite of any of the foregoing embodiments as a first metal part; and (2) subjecting the first metal part and a second metal part of an aluminum alloy to fusion welding.

In additional embodiments, a manufacturing process includes: (1) providing the nanocomposite of any of the foregoing embodiments; and (2) subjecting the nanocomposite to extrusion to form a metal part.

In additional embodiments, a manufacturing process includes: (1) providing the nanocomposite of any of the foregoing embodiments; and (2) subjecting the nanocomposite to thixocasting to form a metal part.

In additional embodiments, a manufacturing process includes: (1) providing the nanocomposite of any of the foregoing embodiments; and (2) performing additive manufacturing using the nanocomposite as a feedstock to form a metal part.

In additional embodiments, a manufacturing process includes: (1) providing the nanocomposite of any of the foregoing embodiments; and (2) subjecting the nanocomposite to heat treatment to form a metal part.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1:
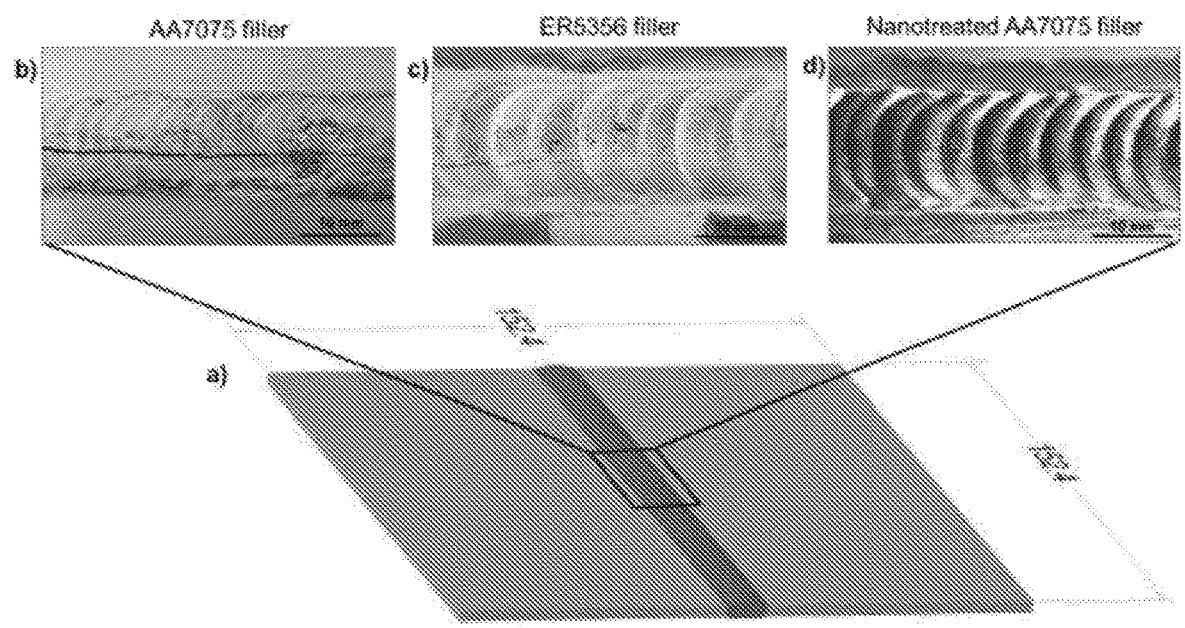
FIG. 1: Gas tungsten arc welding of AA7075. a), Two about 152.4 mm×about 76.2 mm×about 3.175 mm AA7075 sheets were arc welded using three different types of filler materials. b) and c), Macroscopic solidification cracks in a bead's melting zones in welds performed with comparative filler materials, namely AA7075 and ER5356 respectively. d) Using AA7075+about 1.7 vol. % TiC as a filler material, a weld yields an even weld bead without signs of cracking.

Embodiments of this disclosure are directed to nanotechnology-treated (or nano-treated) Al alloys and manufacturing processes of such nano-treated Al alloys.

In some embodiments, a nano-treated Al alloy is a metal matrix nanocomposite, which includes a matrix of Al and one or more additional metals, along with reinforcing nanostructures dispersed in the matrix. In some embodiments, Al is included in the matrix as a majority component (by weight), and the one or more additional metals are included in the matrix as minority components (by weight). Examples of suitable matrix materials include Al alloys of the 7xxx series, such as AA7075 or other Al alloys including Al, zinc (Zn), magnesium (Mg), and copper (Cu); Al alloys of the 2xxx series including Al, Cu, and Mg; Al alloys of the 6xxx series including Al, silicon (Si), Mg, and Cu; Al alloys of the 8xxx series including Al and lithium (Li); other Al alloys; alloys, mixtures or other combinations of two or more of the foregoing.

In some embodiments, nanostructures can have at least one dimension in a range of about 1 nm to about 1000 nm, such as about 1 nm to about 200 nm, about 1 nm to about 150 nm, about 1 nm to about 100 nm, about 1 nm to about 80 nm, about 1 nm to about 60 nm, about 1 nm to about 40 nm, about 1 nm to about 20 nm, or about 1 nm to about 10 nm, although other ranges within about 1 nm to about 1000 nm are contemplated, such as about 1 nm to about 500 nm or about 1 nm to about 300 nm. In some embodiments, the nanostructures can have at least one average or median dimension in a range of about 1 nm to about 1000 nm, such as about 1 nm to about 200 nm, about 1 nm to about 150 nm, about 1 nm to about 100 nm, about 1 nm to about 80 nm, about 1 nm to about 60 nm, about 1 nm to about 40 nm, about 1 nm to about 20 nm, or about 1 nm to about 10 nm, although other ranges within about 1 nm to about 1000 nm are contemplated, such as about 1 nm to about 500 nm or about 1 nm to about 300 nm. In some embodiments, the nanostructures can include nanoparticles having an aspect ratio of about 5 or less, or about 3 or less, or about 2 or less and having generally spherical or spheroidal shapes, although other shapes and configurations of nanostructures are contemplated, such as nanofibers and nanoplatelets. In the case of nanoparticles of some embodiments, the nanoparticles can have at least one dimension (e.g., an effective diameter which is twice an effective radius) or at least one average or median dimension (e.g., an average effective diameter which is twice an average effective radius) in a range of about 1 nm to about 1000 nm, such as about 1 nm to about 200 nm, about 1 nm to about 150 nm, about 1 nm to about 100 nm, about 1 nm to about 80 nm, about 1 nm to about 60 nm, about 1 nm to about 40 nm, about 1 nm to about 20 nm, or about 1 nm to about 10 nm, although other ranges within about 1 nm to about 1000 nm are contemplated, such as about 1 nm to about 500 nm or about 1 nm to about 300 nm.

In some embodiments, nanostructures can include one or more ceramics, although other nanostructure materials are contemplated. Examples of suitable nanostructure materials include metal oxides (e.g., alkaline earth metal oxides, post-transition metal oxides, and transition metal oxides, such as aluminum oxide ($Al_2O_3$), magnesium oxide (MgO), titanium oxide ($TiO_2$), and zirconium oxide ($ZrO_2$)), non-metal oxides (e.g., metalloid oxides such as silicon oxide ($SiO_2$)), metal carbides (e.g., transition metal carbides, such as titanium carbide (TiC), niobium carbide (NbC), chromium carbide ($Cr_3C_2$), nickel carbide (NiC), hafnium carbide (HfC), vanadium carbide (VC), tungsten carbide (WC), and zirconium carbide (ZrC)), non-metal carbides (e.g., metalloid carbides such as silicon carbide (SiC)), metal silicides (e.g., transition metal silicides, such as titanium silicide (TiSi)), metal borides (e.g., transition metal borides, such as titanium boride ($TiB_2$), zirconium boride ($ZrB_2$), hafnium boride ($HfB_2$), vanadium boride ($VB_2$), and tungsten boride ($W_2B_5$)), metal nitrides (e.g., transition metal nitrides), non-metal nitrides (e.g., metalloid nitrides such as silicon nitride), alloys, mixtures, or other combinations of two or more of the foregoing. Particular examples of suitable nanostructure materials include transition metal carbides (e.g., TiC) and transition metal borides (e.g., $TiB_2$), among other transition metal-containing ceramics.

Suitable nanostructures can be selected for self-dispersion in a matrix for processing at a temperature T, which can be set to about ($T_{melt}$+200 K), with $T_{melt}$ being a melting temperature of a matrix material, although other processing temperatures in a range greater than about $T_{melt}$ and up to about ($T_{melt}$+250 K) are contemplated. In some embodiments, selection of the nanostructures can satisfy the following conditions: (1) the nanostructures undergo little or no chemical reaction with a melt of the matrix; (2) good wettability of the nanostructures by the melt of the matrix, as characterized by, for example, a contact angle θ of the melt with a respect to a surface of a nanostructure material at the processing temperature T of less than about 90°, such as about 88° or less, about 85° or less, about 80° or less, about 75° or less, about 70° or less, about 60° or less, about 50° or less, about 40° or less, or about 30° or less; and $$|W_{vdwmax}| < kT \text{ or } |[(A_{nanostructure})^{1/2} - (A_{matrix})^{1/2}]^2 \times (1/12) \times (R/d_1) < kT$$

where $A_{nanostructure}$ is the Hamaker constant of the nanostructure material, $A_{matrix}$ is the Hamaker constant of the matrix material, R is an average effective radius of the nanostructures, $d_1$ can be set to be about 0.4 nm, and k is Boltzmann's constant.

In some embodiments, a nano-treated Al alloy can include nanostructures at a volume fraction of up to about 5% or greater, such as up to about 4.5%, up to about 4%, up to about 3.5%, up to about 3%, up to about 2.5%, or up to about 2%, and down to about 0.5% or less, or down to about 0.1% or less.

During manufacturing of a nano-treated Al alloy of some embodiments, Al and reinforcing nanostructures can be combined at a higher initial volume fraction of the nanostructures than a final volume fraction of the nanostructures, thereby forming an intermediate Al nanocomposite as a master material. The master material can then be heated to form a melt, and one or more additional metals (as minority components) along with additional Al can be incorporated into the melt to adjust weight percentages of Al and the one or more additional metals to their final requisite values and to adjust a volume fraction of the nanostructures to the final volume fraction, thereby forming the nano-treated Al alloy. Alternatively, in other embodiments, Al, the one or more additional metals, and the reinforcing nanostructures can be combined at their requisite weight percentages and at the final volume fraction of the nanostructures, without an intermediate stage.

A resulting nano-treated Al alloy can be further processed and shaped using manufacturing processes, including but not limited to:

1. Solidification Processing (e.g., Casting, Die Casting, Investment Casting)

During solidification processing of some embodiments, a nano-treated Al alloy is heated to form a melt, the melt is delivered to a mold defining a hollow space with a requisite shape, and the melt is cooled to solidify and form a metal part of the nano-treated Al alloy having the requisite shape.

A nano-treated Al alloy (e.g., AA7075+TiC) can exhibit high solidification crack resistance as well as grain refinement during solidification processing. Due to various alterations to solidification mechanics, such as pinning and smoothening of a solidification front, effective mitigation is attained against severe heterogeneous nucleation in dendritic mode of grain growth of an Al alloy without nano-treatment.

Hot cracks and segregations formed during solidification processing and low deformation efficiency can greatly restrict the preparation and the application of Al alloys. By using nano-treatment, the microstructure and mechanical properties of high strength Al alloys (e.g., AA7075+TiC) can be significantly improved, especially their casting properties, such as:

With nano-treatment, the microstructure of high strength Al alloys (such as AA7075+TiC) can be distributed more uniformly. The refinement of Al grains and the modification of secondary phases can be obtained simultaneously due to the high-activity heterogeneous nucleation and pinning effect of TiC nano structures.

Large lamellar eutectic secondary phases of a pure alloy are modified by breaking their links under the presence of TiC nano structures. The secondary phases are distributed more finely and evenly around quasi spherical grains and therefore large eutectic features are barely present.

With nano-treatment, ultra-fine grains with an average size of 17.46±2.97 μm in AA7075+about 1.0 vol. % TiC nanocomposites can be obtained, which is much finer than attained with other grain refiners. The effect of nano structures on grain morphology extends beyond grain refinement, and also yields a change from dendritic growth to quasi spherical growth, hence differing significantly from other approaches for grain refinement. The modification of secondary phases can improve a mold-filling capacity and decrease cracks formed during solidification processing.

With nano-treatment, the tensile strength and hardness of as-cast AA7075+about 1.0 vol. % TiC nanocomposites can reach up to about 284.06 MPa (or greater) and about 123.7 HV (or greater).

With regard to die casting and investment casting, and due to the crack-free solidification behavior of a nano-treated Al alloy, the material can be cast into complex and high aspect ratio geometries, such as turbocharger turbine wheels or cellphone middle frames. These parts are normally machined, causing high production costs.

2. Fusion Welding (e.g., Arc Welding)

A significant amount of research has been conducted in order to allow fusion welding for high strength Al alloys, especially AA7075. These approaches, to optimize welding parameters or identify metallurgic remedies for the solidification crack susceptibility of high strength 7xxx and 2xxx series Al alloys, sometimes could not eliminate the long-standing problem.

In some embodiments, the use of nano-treatment effectively provides a solution for fusion welding of high strength Al alloys. For example, during arc welding, a nano-treated Al alloy is provided as a filler material that is placed between two metal parts of an Al alloy to be welded together, and the metal parts with the filler material in between are subjected to arc welding, by heating to at least partially melt the metal parts and the filler material, followed by cooling to cause solidification and fusion. In some embodiments, a chemical composition of the Al alloy of the filler material is substantially the same as a chemical composition of the Al alloy of the metal parts (e.g., in terms of weight percentages of Al and one or more additional metals).

Benefits of Nano-Treatment for Arc Welding Include:

Experiments on gas tungsten arc welding (GTAW) of AA7075 using nano-treated AA7075+TiC as a filler wire have shown that, similar to solidification during casting, a dendritic grain growth of a melting zone is suppressed. Using AA7075+about 1.7 vol. % TiC, the resulting melting zone of a joint exhibited spherical grains with an average size of 9.4±5 μm. Therefore, the use of a nano-treated filler material of a chemical composition substantially equal to a base material of a metal part to be welded can allow arc welding for a variety of Al alloys of the 7xxx series.

As mentioned in casting, a secondary phase of an as-welded melting zone is refined, and the appearance of a lamellar eutectic phase is modified.

Compared to filler materials of alloys such as ER5356 and ER4043 used to mitigate solidification cracking when welding less hot crack susceptible 7xxx and 6xxx series Al alloys, (e.g., AA7005 and AA6061), a nano-treated filler material can conform to a chemical composition of any alloy of the 7xxx series and therefore eliminate the drawbacks of welding with a dissimilar filler material (e.g., liquation cracking and coefficient of thermal expansion (CTE) mismatch stress).

Having substantially equal chemical composition in a melting zone and a base material will furthermore have a beneficial effect on a welding joint's response to post-weld heat treatment. It is found that, when using a T6 post-weld heat treatment, substantially full recovery of the microhardness in the melting zone can be attained to a wrought material's value and can reach transversal tensile strength of up to about 96% of the base material's initial value. This presents a significant advantage over using dissimilar filler materials which are not heat treatable.

If a base material itself is a nano-treated Al alloy with a hot crack-resistant composition, then a filler material may be omitted, and a weld can be performed autogenously without hot cracking.

Similar benefits discussed above can be attained for gas metal arc welding (GMAW), plasma arc welding, laser beam welding, laser-hybrid welding (plasma, gas tungsten arc welding (GTAW), and GMAW augmented laser welding), electron beam welding, and resistance welding, among others. All these fusion welding methods can be performed autogenously if a base material is an Al alloy that is nano-treated or with a non-treated base material of an Al alloy if a filler material is nano-treated. In case of resistance welding, a filler material can be introduced in the form of a small coin like nano-treated disc or ring, placed in between two base metal sheets or tubes. Generally the nano-treatment approach is applicable to any fusion process that involves material solidification.

3. Extrusion and Other (Thermo)Mechanical Processing

A nano-treated Al alloy (e.g., 7xxx series Al alloy) can have superior extrudability (or plastic deformation capability) compared with Al alloys without nano-treatment. During extrusion of some embodiments, a nano-treated Al alloy provided in the form of a primary billet is heated to form a melt, the melt is forced through a die having a cross-section with a requisite shape, and the melt is cooled to solidify and form a metal part of the nano-treated Al alloy having the requisite shape.

In order to be considered to have good extrudability, a primary billet should have a fine, substantially equiaxed and substantially dendrite-free grain structure. Benefits of nano-treatment for extrusion include:

As-cast nano-treated Al alloy (e.g., AA7075) exhibits a fine, substantially equiaxed grain structure, such as grains having aspect ratios (or an average or median aspect ratio) of about 3 or less, about 2.5 or less, or about 2 or less and having generally spherical or spheroidal shapes, and having largest dimensions (or an average or median largest dimension) in a range of about 1 nm to about 100 nm, such as about 1 nm to about 80 nm, about 1 nm to about 60 nm, about 1 nm to about 40 nm, about 1 nm to about 20 nm. Therefore, as-casted nano-treated 7xxx series Al alloy can be directly used as a primary billet for an extrusion process, without further treatment.

Due to a fine grain structure of a nano-treated Al alloy, a productivity of an extrusion process can be improved, as well as resulting metal parts' surface and overall quality. AA7075 is typically extruded at a maximum extrusion ratio of about 40 at a speed of about 2 m/min. Experiments show that AA7075 treated with about 1-2 vol. % nanoparticles is extrudable at an extrusion ratio of about 78 without extrusion defects.

During heating as part of, or prior to, hot extrusion, a grain size can be pinned by nanostructures, thereby inhibiting static grain recrystallization (see Heat Treatment section below).

After extrusion, a refined grain size due to plastic deformation can once again be pinned by nano structures. Static grain recrystallization in a still-hot metal part is inhibited (see Heat Treatment section below).

Other (thermo)mechanical processing include rolling, drawing, forging, deep drawing, and hydroforming.

4. Thixocasting

A nano-treated Al alloy (e.g., 7xxx series Al alloy) can have superior thixocastability compared with Al alloys without nano-treatment. During thixocasting of some embodiments, a nano-treated Al alloy provided in the form of a primary billet is heated to form a semi-solid, the semi-solid is delivered to a mold defining a hollow space with a requisite shape, and the semi-solid is cooled to solidify and form a metal part of the nano-treated Al alloy having the requisite shape. In order to obtain thixotropic flow behavior, this process specifies billets having a substantially equiaxed, non-dendritic grain structure.

Benefits of Nano-Treatment for Thixocasting Include:

As-cast nano-treated Al alloy (e.g., AA7075) exhibits a fine substantially equiaxed grain structure, such as grains having aspect ratios (or an average or median aspect ratio) of about 3 or less, about 2.5 or less, or about 2 or less and having generally spherical or spheroidal shapes, and having largest dimensions (or an average or median largest dimension) in a range of about 1 nm to about 100 nm, such as about 1 nm to about 80 nm, about 1 nm to about 60 nm, about 1 nm to about 40 nm, about 1 nm to about 20 nm. Therefore, as-casted nano-treated 7xxx series Al alloy can be directly used as a primary billet for thixocasting, without further treatment.

After thixocasting, a refined grain size due to plastic deformation can once again be pinned by nano structures. Static grain recrystallization in a still-hot metal part is inhibited (see Heat Treatment section below).

5. Additive Manufacturing and Direct Deposition of Nano-Treated Wires and Powders Wire Arc Additive Manufacturing (WAAM):

WAAM involves a heat source (plasma, electric arc, laser, or electron beam) creating a small melt pool and a wire feeder which feeds a metal into the melt pool and therefore building up material layer by layer. This process involves similar conditions as fusion welding and is therefore constrained to non-hot crack susceptible Al alloys. If using nano-treated high strength Al alloy wire as a feed stock, crack-free and fine-grained parts can be fabricated from formerly un-printable Al alloys.

Selective Laser Melting (SLM):

Nano-treated Al alloys can be powderized, by, for example, gas atomization, and used as a powder feedstock in SLM machines. Using this nano-treated Al alloy powder feedstock, crack-free and fine-grained parts can be fabricated from formerly un-printable Al alloys.

Direct Energy Deposition (DED):

Similarly to WAAM, DED involves a heat source (plasma, electric arc, laser, or electron beam) which heats a substrate while a powder is sprayed onto the substrate, and material is therefore added. Like other additive manufacturing processes, DED is sensitive to hot cracking. Using a nano-treated Al alloy powder feedstock, crack-free and fine-grained parts can be fabricated from formerly un-printable Al alloys.

Thermal Spraying:

For thermal spraying, a nano-treated Al alloy can be used in either gas atomized powder form or as a spooled wire similarly to WAAM. Since the material undergoes melting and rapid solidification during the process, the process is sensitive to hot cracking. Using a nano-treated Al alloy powder feedstock or nano-treated Al alloy wire, crack-free and fine-grained parts can be fabricated from formerly un-printable Al alloys.

6. Heat Treatment

7xxx and 2xxx series high strength aluminum alloys are heat-treatable Al—Zn—Mg—Cu and Al—Cu—Mg alloys respectively. Based on aging, T6 heat treatment can be used to enhance the mechanical properties of the alloys. Nevertheless, a distribution and a size of grains can mainly depend on the heat treatment process, which can influence the mechanical properties of the alloys.

Benefits of Nano-Treatment for Heat Treatment Include:
After T6 heat treatment (heating at about 480° C. for about 1 h and then aging at about 120° C. for about 19 h), substantially equiaxed grains in AA7075+about 1 vol. % TiC (initially 17.46±2.97 µm) nanocomposites grew by just about 6% to an average grain size of 18.52±4.0 µm. In comparison, if subjected to the same heat treatment, the size of dendritic grains in AA7075 alloy without nano-treatment grows by several 100%, to hundreds of micrometers.

Even when prolonging the solutionizing stage to about 4 h at about 480° C. followed by aging at about 120° C. for about 19 h, substantially equiaxed grains in AA7075+about 1 vol. % TiC nanocomposites remain substantially the same with an average grain size of 18.02±2.17 µm. This indicates that the recrystallization grain growth of nano-treated AA7075 at about 480° C. saturates after a marginal increase in diameter and becomes time independent.

With T6 heat treatment, a tensile strength and a hardness of AA7075+about 1 vol. % TiC nanocomposites can reach up to about 474.92 MPa (or greater) and about 181.8 HV (or greater), respectively.

7. Corrosion Resistance

The corrosion resistance of a nano-treated Al alloy (e.g., AA7075) subjected to sea salt can remain substantially unchanged compared to the Al alloy without nano-treatment.

A nano-treated Al alloy (e.g., 7xxx series Al alloy) can be less susceptible to corrosion and stress corrosion cracking.

EXAMPLE EMBODIMENTS

Some embodiments are directed to a metal matrix nanocomposite. In some embodiments, the nanocomposite includes a matrix including an Al alloy, and nanostructures dispersed in the matrix. In some embodiments, the matrix includes grains having aspect ratios (or an average aspect ratio) of about 3 or less, about 2.5 or less, or about 2 or less. In some embodiments, the matrix includes Al as a majority component by weight, and at least one additional metal different from Al. In some embodiments, the at least one additional metal is selected from Zn, Mg, and Cu. In some embodiments, the nanostructures have an average dimension in a range of about 1 nm to about 200 nm. In some embodiments, the nanostructures include a ceramic. In some embodiments, the ceramic is a transition metal-containing ceramic. In some embodiments, the transition metal-containing ceramic is selected from transition metal carbides and transition metal borides. In some embodiments, the transition metal-containing ceramic is TiC. In some embodiments, the transition metal-containing ceramic is $TiB_2$. In some embodiments, the nanostructures are dispersed in the matrix at a volume fraction of up to about 5% of the nanocomposite. In some embodiments, the volume fraction of the nanostructures in the nanocomposite is up to about 3%. In some embodiments, the volume fraction of the nanostructures in the nanocomposite is up to about 2.5%.

Additional embodiments are directed to a manufacturing process, which includes providing the nanocomposite of any of the foregoing embodiments, and subjecting the nanocomposite to solidification processing (e.g., casting) to form a metal part. In some embodiments, subjecting the nanocomposite to solidification processing includes heating the nanocomposite to form a melt, delivering the melt to a mold defining a hollow space with a requisite shape, and cooling and solidifying the melt to form the metal part having the requisite shape.

Additional embodiments are directed to a manufacturing process, which includes providing the nanocomposite of any of the foregoing embodiments as a filler material, placing the filler material between metal parts of an Al alloy to be welded together, and subjecting the metal parts with the filler material in between to fusion welding (e.g., arc welding). In some embodiments, a chemical composition of the Al alloy of the filler material is substantially the same as a chemical composition of the Al alloy the metal parts.

Additional embodiments are directed to a manufacturing process, which includes providing the nanocomposite of any of the foregoing embodiments as a first metal part, and subjecting the first metal part and a second metal part of an aluminum alloy to fusion welding. In some embodiments, a chemical composition of the Al alloy of the first metal part is substantially the same as a chemical composition of the Al alloy the second metal part.

Additional embodiments are directed to a manufacturing process, which includes providing the nanocomposite of any of the foregoing embodiments, and subjecting the nanocomposite to extrusion to form a metal part. In some embodiments, subjecting the nanocomposite to extrusion includes heating the nanocomposite to form a melt, forcing the melt through a die having a cross-section with a requisite shape, and cooling and solidifying the melt to form the metal part having the requisite shape.

Additional embodiments are directed to a manufacturing process, which includes providing the nanocomposite of any of the foregoing embodiments, and subjecting the nanocomposite to thixocasting to form a metal part. In some embodiments, subjecting the nanocomposite to thixocasting includes heating the nanocomposite to form a semi-solid, delivering the semi-solid to a mold defining a hollow space with a requisite shape, and cooling and solidifying the semi-solid to form the metal part having the requisite shape.

Additional embodiments are directed to a manufacturing process, which includes providing the nanocomposite of any of the foregoing embodiments, and performing additive manufacturing using the nanocomposite as a feedstock to form a metal part.

Further embodiments are directed to a manufacturing process, which includes providing the nanocomposite of any of the foregoing embodiments, and subjecting the nanocomposite to heat treatment to form a metal part. In some embodiments, subjecting the nanocomposite to heat treatment includes heating during a first stage to a first temperature for a first time duration, followed by cooling, and then followed by heating during a second stage to a second temperature for a second time duration, where the first temperature is greater than the second temperature, and the first time duration is smaller than the second time duration.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Nanoparticle-Based Phase Control for Arc Welding of Unweldable Aluminum Alloy 7075

Overview:

Lightweight materials and structures are of paramount importance to reduce energy consumption and emissions in today's society. For materials to qualify for widespread use in lightweight structural assembly, welding or joining is widely considered as a central characteristic. This, however, has been a long-standing issue for high strength aluminum alloys, such as 7075 (AA7075) due to their hot crack susceptibility during fusion welding. Here this example shows that AA7075 can be safely arc welded without hot cracks by introducing nanoparticle-based phase control during welding. Joints welded with an AA7075 filler wire containing titanium carbide (TiC) nanoparticles exhibited fine globular grains and a modified secondary phase, which intrinsically mitigate against hot crack susceptibility, and moreover showed exceptional tensile strengths in both as-welded and post-weld heat treated conditions. This modification to the filler material of a fusion weld by nanotechnology can be generally applied to a wide range of hot crack susceptible materials for significant impacts.

Introduction

Lighter materials and structures are paramount for reducing fuel consumption and emissions for various transportation applications, especially for automotive and aerospace industries. It has been indicated that an about 10% weight reduction results in an about 6-8% increase in fuel economy for automobiles. Assembling lightweight structural parts to a functional assembly is thus of paramount importance for today's society and industry such as modern automotive, construction, shipbuilding and aviation. Welding or joining specifies reduced effort and cost for effective design and therefore weldability is widely considered as a central aspect in the process of qualifying materials for widespread use.

The use of lightweight aluminum (Al) in vehicles has been increasing rapidly throughout the last decade. By using Al alloys of higher strength, the vehicle weight can be further reduced. With their superior high strength to weight ratio, heat-treatable Al alloys, especially the 2xxx and 7xxx series, often find applications in today's aerospace or military industries. Among 7xxx alloys is Al alloy 7075 (AA7075, an Al—Zn—Mg—Cu alloy), which has exceptional strength at low weight. However, these materials are notorious for their susceptibility to cracking during arc welding, thus significantly constraining their widespread use, such as in automobiles. Due to the unweldability of AA7075, and high strength aluminum alloys in general, currently the aerospace industry strongly relies on riveting and bolting to join these materials to a complex assembly. Recently friction stir welding (FSW), a solid state joining technology, has been implemented to join AA7075. However, the fully mechanized nature of the FSW process impedes its use for applications where access or weld shape is complicated. The work piece also has to be restrained in well-designed support tooling, making it difficult to restrain parts properly for complicated welds in FSW. Therefore, arc welding of AA7075 is still highly desired for airplanes or vehicles, while its arc weldability remains as a barrier.

A significant amount of research has been conducted in order to allow arc welding for high strength aluminum alloys, especially AA7075. These approaches, to optimize welding parameters or identify metallurgic remedies for the unweldability of these materials unfortunately could not solve the long-standing problem.

Here this example shows that a nanoparticle-enhanced AA7075 filler wire can be used to weld the notoriously unweldable material. This approach intrinsically mitigated against the occurrence of solidification cracking, as well as liquation cracking, the two dominant hot crack modes that have impeded against successful arc welding of AA7075 for decades. Furthermore, the resulting welds have grain sizes of about 9 μm in the melting zone with little or no dilution of the strengthening elements in the melting zone. The welds showed an unprecedented ultimate tensile strength of up to about 392 MPa in an as-welded condition, while reaching up to about 551 MPa with post-weld heat treatment. This indicates that the introduction of a nanotechnology-treated welding wire to arc welding of AA7075 allows fusion welding for structural design of this high-performance alloy for mainstream applications such as in electrical vehicles. This improved nanotechnology treatment approach can be readily extended for fusion welding of other hot crack susceptible materials beyond the 2xxx and 7xxx series aluminum alloys.

Figure 6:
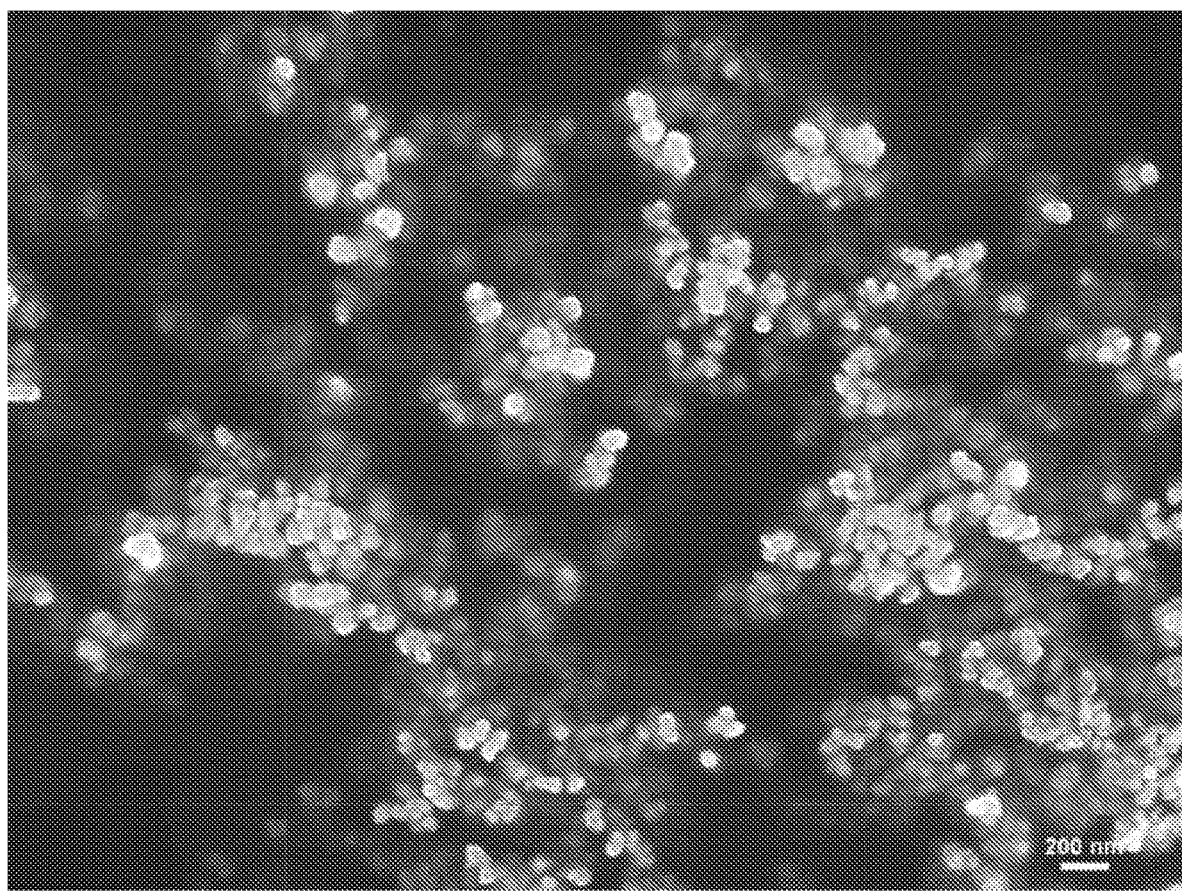
FIG. 6: TiC nanoparticles as received. SEM image is shown of a TiC nanoparticle powder as received from US Research Nanomaterials, Inc. Using flux assisted liquid state incorporation, these nanoparticles were incorporated into aluminum.

Arc Welding Results:

A nanotechnology-treated AA7075 filler rod was fabricated by incorporating about 1.7 vol. % of about 40 nm-about 60 nm TiC nanoparticles into AA7075 using salt assisted nanoparticle incorporation and hot extrusion (see Methods and FIG. 6). A major advantage of this fabrication process over particle coated filler rods or filler tubes with a nanoparticle core is the state in which nanoparticles are introduced into a melt while welding. By already incorporating dispersed nanoparticles into an aluminum matrix prior to the actual welding process, the transition of reinforcements into a melting zone is more effective. For the purpose of comparison, arc welding experiments are conducted using an ER5356 (Al-5Mg) filler, a substantially pure AA7075 filler and the improved nanotechnology-treated AA7075 rod, to fuse two AA7075 sheets with a dimension of about 152.4 mm×about 76.2 mm×about 3.175 mm each, as shown in FIG. 1a (see Methods). Welds performed with these three different filler materials are shown in FIG. 1b-d. It should be noted that the weld parameters, with relatively high heat input and relatively slow welding speed, were chosen to increase the thermal stress as well as the solidification shrinkage and therefore showcase the impact of the improved material on solidification crack susceptibility.

FIG. 1b shows a weld performed with the substantially pure AA7075 filler material. The continuous, macroscopic crack at the center line of the joint is representative of AA7075's susceptibility to solidification cracking when fusion welded. The weld performed using ER5356 is shown in FIG. 1c. This type of filler is used to mitigate the occurrence of solidification cracking, when welding less crack susceptible materials, such as AA6061 and AA7005. Nevertheless, in the experiment, the effect of this filler material was unsatisfactory and did not suppress solidification cracking in AA7075. The joint showed the same error pattern as in FIG. 1b. The third weld performed with nanotechnology-treated (or nano-treated) AA7075 filler material showed a surprisingly different picture. The bead shown in FIG. 1d was free of macroscopic imperfections, while welded under the same parameters as the two comparative filler materials.

Figure 2:
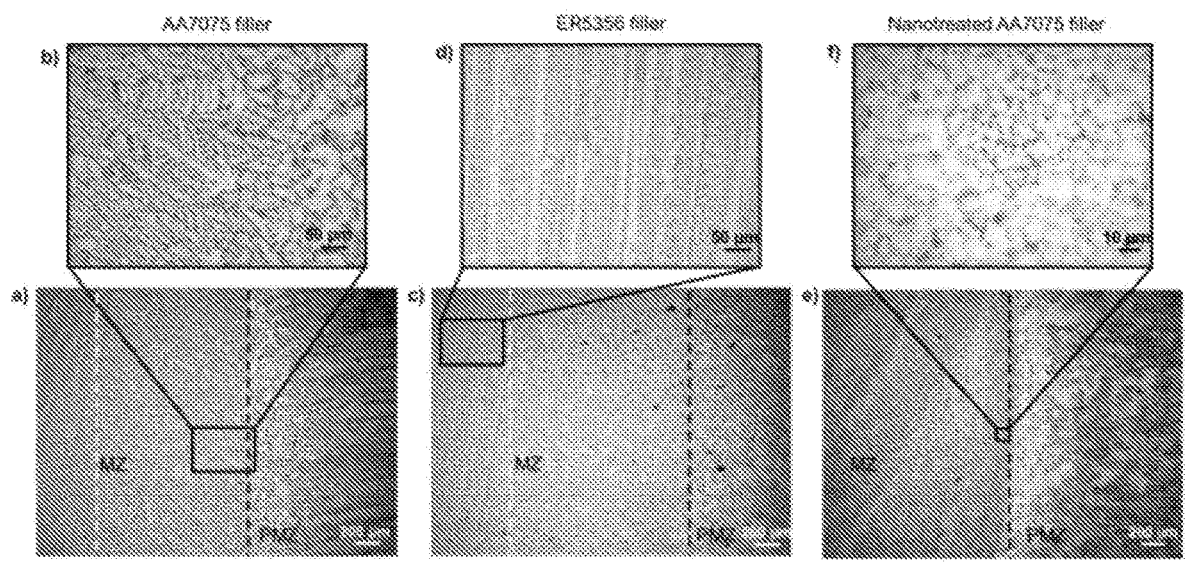
FIG. 2: Optical microscope characterization of horizontal weld bead cross-sections, in-plane with the welded base sheets, as shown in FIG. 1. a), c) and e), Grain morphology of welds performed with AA7075, ER5356 and nano-treated AA7075 as filler materials, respectively. The black dashed lines indicate the fusion line of a melting zone (MZ) and a partially melted zone (PMZ), while the white dashed lines indicate the transition of curved grain growth adjacent to the fusion line and columnar, trailing grain growth in the weld bead's center. b), Dendrite originated from fusion line. d), Columnar grains in the weld's center section. c), Globular grains in the MZ of nano-treated AA7075 weld.

Optical Characterization:

To further understand these results, microstructure studies are performed using optical microscopy (OM) and Weck's Reagent to unveil the different melting zones' grain morphologies. In FIG. 2a the drawbacks of welding AA7075 with the identical composition filler material become noticeable.

Due to the alloy's wide semi-solid zone and non-linear solid fraction versus temperature curve, the melting zone solidifies in large dendrites trailing the heat input. Inset FIG. 2b shows curved dendritic grains adjacent to the fusion line with an average size of 116.5±68.7 μm, while closer to the centerline the highly dendritic grains reach a length of hundreds of micrometers. During solidification, these dendrites form liquid trenches that has to be supplied with liquid from the melting zone (MZ) while gradually transiting from liquid to solid state. If these trenches, by spontaneous nucleation at the entrance or merging of solidification fronts, are cut off from the MZ, the remaining liquid fraction forms a pocket. The volume shrinkage of the trapped liquid will cause perpendicular tension regarding the welding direction. If the pressure inside this trench drops below the cavitation pressure, a void forms, initiating a crack which trails the MZ. This phenomenon strongly depends on the solidification speed of the manufacturing process.

FIG. 2c shows the melting zone welded with the ER5356 filler rod. It can be found that the grain size adjacent to the fusion line is reduced to an average of 70.5±44.5 µm, while the columnar dendritic grain growth, shown in inset FIG. 2d, remains similar to the weld performed with the AA7075 filler material. The aim of welding with a dissimilar filler material is to heavily dilute a crack sensitive base material with a less crack sensitive filler material. However, with this approach, several compromises are made. By diluting the melting zone with a dissimilar filler alloy, the concentration of strengthening alloy components of AA7075 decreases. This leads to a decrease in as-weld strength, as well as a reduced responsiveness to post-weld heat treatments. Furthermore, the use of these filler rods will increase the likelihood of liquation cracking. Aluminum filler alloys, such as ER5356, can cause the melting zone to solidify earlier than the partially melted zone, adjacent to the melt pool. To be more precise, the solid fraction of the melt pool composition becomes larger than the solid fraction of pure AA7075 in the partially melted zone at the same temperature. This causes tension on the weakened partially melted zone (PMZ) towards the center of the melt pool and ultimately leads to liquation cracks. This failure mode was not observed in this evaluation due to stress relief brought by solidification cracking.

With the nano-treated filler material, an alternative approach has been implemented successfully that has the potential of fundamentally changing the material's solidification mechanisms, allowing fusion welding for AA7075 without any of the aforementioned drawbacks. FIG. 2e shows the horizontal cross-section of the joint which was welded using AA7075 treated with about 1.7 vol. % TiC filler rod. FIG. 2e reveals a homogeneous grain morphology throughout the MZ, which is very different from the previously introduced comparative welds. The grains are highly equiaxed with an average size of 9.4±5.0 µm, showing smooth grain boundaries. With the addition of nanoparticles, however, the epitaxial nucleation at the liquid-solid interface remains favorable. Several beneficial mechanisms are introduced to the solidification process causing this particular grain morphology. Firstly, the presence of TiC decelerates the solidification front and therefore reduces the speed of dendritic grain growth originating from the liquid-solid interface. The decelerated grain growth allows the formation of an area adjacent to the interface with increased undercooling, where the presence of nanoparticles adds heterogeneous nucleation to the solidification process. This effect is promoted for aluminum and TiC having a lattice mismatch factor of about 5.8% which indicates substantially complete epitaxy of the aluminum grain nucleating at the nanoparticles surface. Lastly, nanoparticles alter the appearance of these heterogeneously nucleated grains, and can have a strong impact on equiaxed dendritic grain growth, yielding a globular grain appearance as shown in the inset of FIG. 2f.

This absence of directional, dendritic grain growth is an important indicator of the advantages that nano-treated filler materials bring to the welding process of hot crack susceptible aluminum alloys. Furthermore, the use of a similar filler material intrinsically mitigates against the occurrence of liquation cracking.

Figure 3:
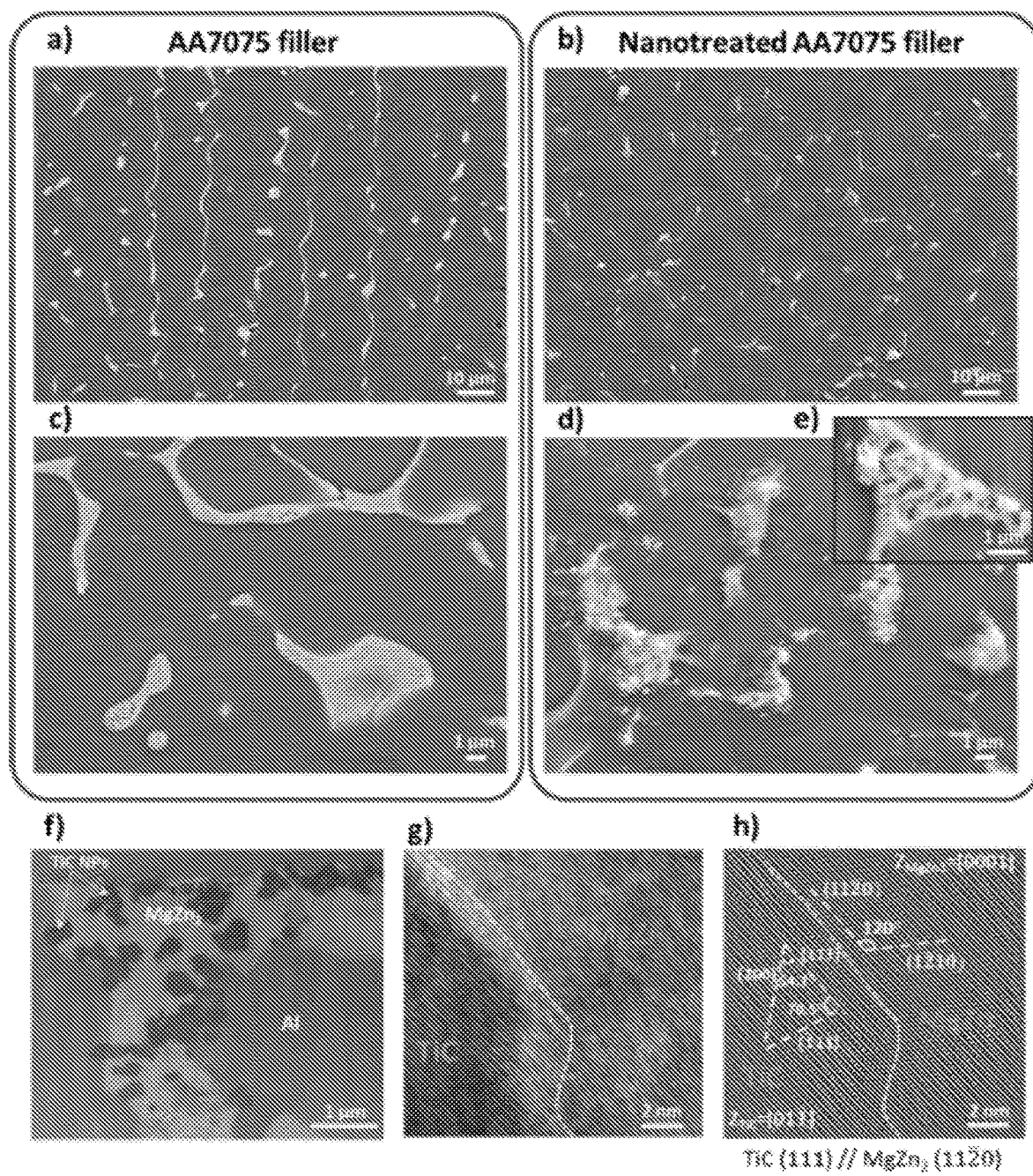
FIG. 3: Scanning electron microscopy (SEM) characterization of horizontal weld bead cross-sections presented in FIG. 2 of substantially pure AA7075 and nano-treated AA7075 melting zones. a) and c), Secondary phase microstructure of a melting zone welded with AA7075 filler material. b), d) and e), Modified secondary phase of AA7075, welded with nano-treated filler material. f), Transmission electron microscopy (TEM) sample showing a cross-sectional view of the modified secondary phase by nano-treated filler material. g), A typical high resolution TEM image of the interface between a TiC nanoparticle and a secondary phase (identified as $MgZn_2$). h), Fourier-filtered high resolution TEM image corresponding to g).

Characterization by Scanning Electron Microscopy (SEM) and Transmission Electron Microscopy (TEM):

To further understand the effects of TiC nanoparticle on AA7075's solidification behavior, scanning electron microscopy (SEM) and transmission electron microscopy (TEM) were utilized to investigate the secondary phase morphology of melting zones welded with substantially pure AA7075 and nano-treated AA7075 filler. FIG. 3a shows the typical secondary phase distribution of a substantially pure AA7075 melting zone. As observed in the OM images, the appearance of a secondary phase in the pure aluminum alloy indicates dendritic solidification of the α-aluminum grains. At the weld center, this solidification mode leads to relatively long and continuous segregations at the grain boundaries in the welding direction.

Figure 7:
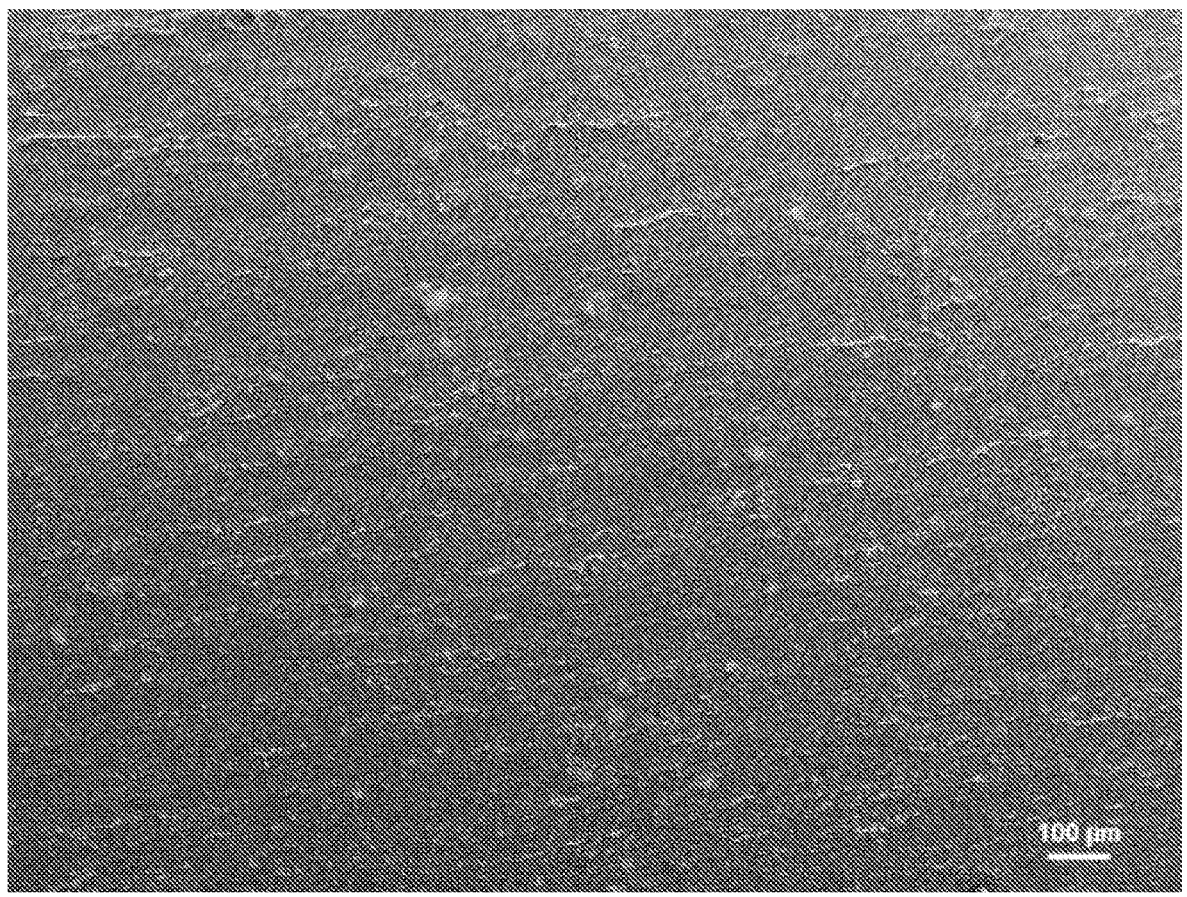
FIG. 7: SEM Image of AA7075+TiC welding rod cross-section. The image shows TiC nanoparticle strips in an extrusion direction. The occurrence of these strips is evenly distributed throughout the welding rod.
Figure 8:
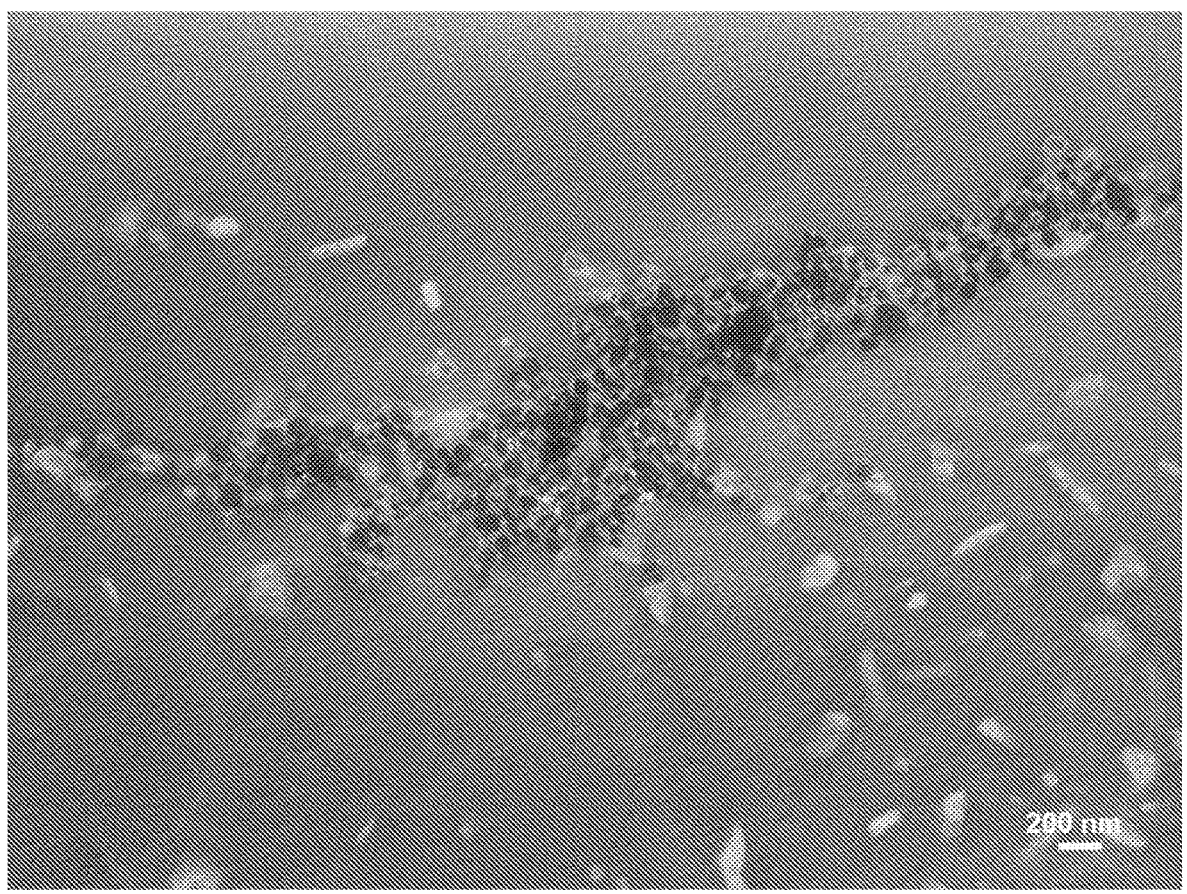
FIG. 8: SEM Image of AA7075+TiC welding rod cross-section. High magnification image of one of the TiC nanoparticle strips shown in FIG. 7. TiC mainly remains within AA7075's secondary phase at grain boundaries. The nanoparticles appear to be de-agglomerated and well dispersed within the secondary phase.

As stated earlier, this dendritic grain growth is undesired since it may cause macroscopic or microscopic cavities and cracks. Moreover, such continuous longitudinal secondary phase features cause the melting zone to have low tensile strength perpendicular to the welding direction. At larger magnification in FIG. 3c, it is observed that the secondary phase of pure alloy solidifies in large eutectic $Mg(Zn,Cu,Al)_2$ areas especially at triple junctions of grain boundaries. FIG. 3b shows a typical secondary phase under the presence of TiC nanoparticles. Here, the secondary phase is segmented, while its fragments are randomly oriented and much finer and shorter than their counterparts in the pure alloy. FIG. 3d shows areas of locally larger intermetallic in the nano-treated melting zone. Here the advancing grain boundaries accumulated TiC in the terminal stages of solidification, resulting in a locally higher volume percentage of nanoparticles in the secondary phase (see FIGS. 7 and 8). Therefore, the occurrence as well as the size of eutectic features were drastically reduced. Inset in FIG. 3e shows one of the few lamellar $Mg(Zn,Cu,Al)_2$ phases formed during solidification. The nanoparticles modified its regular lamellar pattern, by divorcing links within the structure. These findings are in accordance with the melting zone's reduced crack susceptibility. The finer, randomly oriented segregations and the reduced size of divorced eutectic features in combination with round and equiaxed grains indicate high flowability of the secondary phase up to the terminal stage of solidification. Therefore, the entrapment of liquid secondary phase pockets, which are responsible for solidification cracking, is unlikely.

To clearly reveal the interface between the TiC nanoparticles and secondary $Mg(Zn,Cu,Al)_2$ phases, TEM analysis at atomic scale was utilized. FIG. 3f shows a SEM image of the TEM sample cut from nano-treated eutectic $Mg(Zn,Cu,Al)_2$ areas containing TiC nanoparticles. As marked in the figure, it is observed that most TiC nanoparticles stay either inside the secondary phase or at the boundary between Al matrix and $Mg(Zn,Cu,Al)_2$ phase. This indicates that TiC nanoparticles preferentially stay within $Mg(Zn,Cu,Al)_2$ phases during solidification and effectively modify the size, shape and distribution of secondary phases in the melting zone. FIG. 3g shows a typical interface between TiC nanoparticles and a secondary phase. FIG. 3h is the Fourier-filtered atomic resolution TEM image corresponding to FIG. 3g. The observed secondary phase was identified as $MgZn_2$ phase by its atomic structure. As marked in FIG. 3h, $(11\overline{2}0)$ and (1210) planes of MgZn$_2$ were identified with an angle of about 120°. The MgZn$_2$ phase is oriented to the [0001] zone axis. Furthermore, a TiC nanoparticle's (111), (111) and (200) planes are identified and marked in the atomic structure. This TiC nanoparticle is oriented to the [011] zone axis. The (111) planes of TiC are shown to be parallel with the (1120) planes of MgZn$_2$. The (111) planes of TiC have an angle of about 10° between (1210). The plane distance of (111) TiC and (1210) MgZn$_2$ are about 0.2499 nm and about 0.2609 nm, respectively. Thus, the misfit at the TiC—MgZn$_2$ interface is calculated to be about 5.6% which indicates a semi-coherent interface. The good lattice matching also explains why TiC nanoparticles tend to affiliate to the secondary MgZn$_2$ phase and effectively modify MgZn$_2$ for improved welding quality.

Differential Scanning Calorimetry (DSC) Analysis:

To further interpret the changes TiC nanoparticles introduce to AA7075's α-grain, as well as to its secondary phase morphology, melting zone samples of joints welded with substantially pure and nano-treated AA7075 filler rod were analyzed using DSC. When comparing the two cooling curves in FIG. 4a the heat release peaks of α-grain nucleation differ significantly. The curve representing the pure material shows a steep increase as well as a steep decrease before and after reaching its first minimum. This indicates the explosive growth of α-grains once successfully nucleated. In contrast, the nano-treated sample's α-peak amplitude is about 20% lower, while the slope after reaching its maximum appears to be less steep. This indicates that the growth of the nano-treated alloy's alpha grains is decelerated, resulting in a more continuous nucleation.

Figure 4:
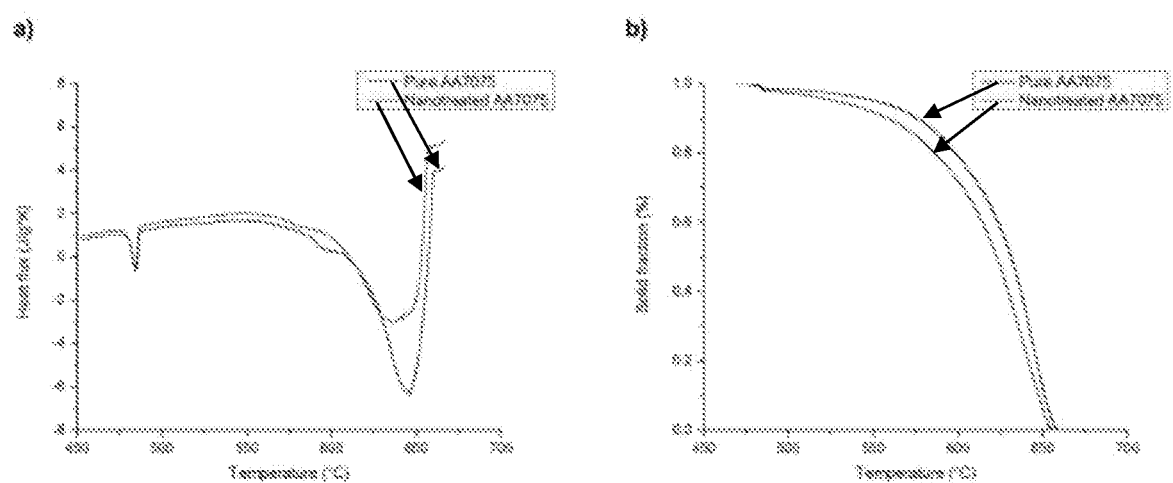
FIG. 4: Differential Scanning calorimetry (DSC) analysis of substantially pure AA7075 and nano-treated AA7075 melting zones. a), DSC cooling curves showing the normalized heat flux of melting zone samples taken from joints welded with AA7075 and with nano-treated AA7075 filler materials. b), Solid fraction vs. temperature curves derived from DSC results.

Comparing the solid fraction curves derived from the heat flow curve, shown in FIG. 4b, this phenomenon becomes more evident. The sharp turnover point in the pure sample's solid fraction curve is characteristic of the material's unfavorable solidification mechanisms. For the sample welded with the filler containing about 1.7 vol. % TiC this turnover point is flattened and shows a continuous grain growth up to the crucial, terminal stages of solidification, where solidification cracking is initiated. Furthermore, the onset of secondary phase nucleation is delayed by almost 12° C. for the nano-treated alloy. This delay in combination with pinned and restricted growth of α-grains support the hypothesis of improved flowability of a liquid melt throughout the melting zone's solidification process.

Figure 5:
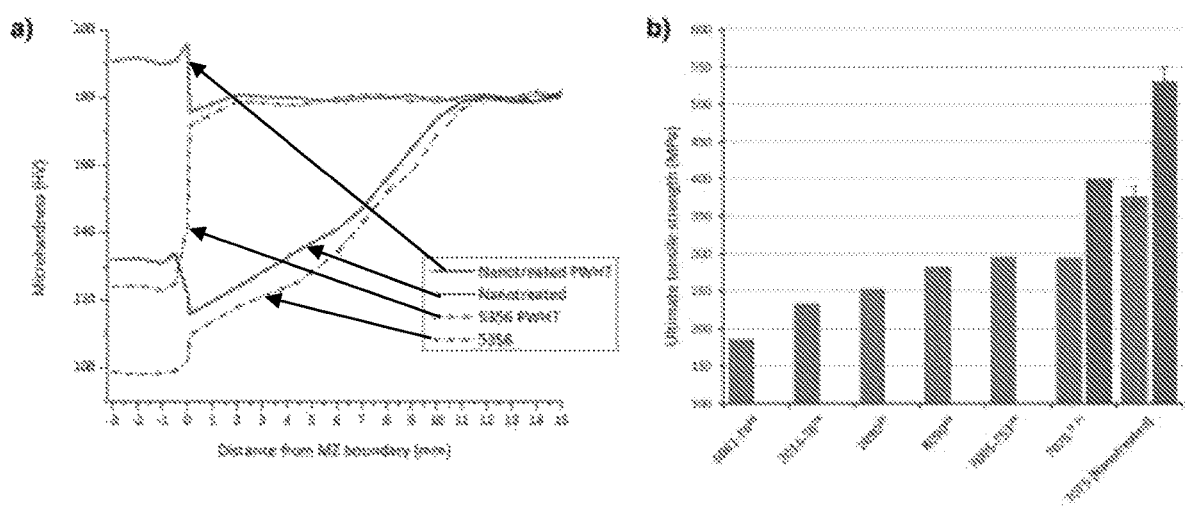
FIG. 5: Mechanical properties of nano-treated AA7075 welds. a), Microhardness tests were conducted at the centerline of transversal vertical cross-sections. The graph compares the Vicker's hardness values of welds performed with ER5356 filler and nano-treated AA7075 filler in as-welded and post-weld heat treatment (PWHT) conditions. b), From left to right, the lighter shaded bars show a selection of high strength aluminum alloys welded by gas tungsten arc welding (GTAW), AA7075 welded with ER5356 filler material and AA7075 welded with nano-treated AA7075 filler material. The darker shaded bars show an AA7075 modified indirect electric arc (MIEA) weld with ER5356 as filler and AA7075 welded with nano-treated AA7075 filler material after the same PWHT.

Mechanical Properties:

To showcase the effect of nano-treated AA7075 filler material on the weld's mechanical properties, microhardness as well as tensile tests have been performed. To highlight the superior performance of this improved filler material over the comparative ER5356 filler, cross-sectional microhardness mappings for welds performed with ER5356 and nano-treated AA7075 filler material are shown in FIG. 5a. The high value for microhardness of the latter's melting zone in as-welded condition, compared to the comparative filler rod, can be attributed to an altered chemical composition as well as to strengthening mechanisms in metal matrix nanocomposites, such as the Hall-Petch effect and Orowan strengthening. Since the parameters were kept constant for all welding experiments, it is also noteworthy that degradation of the partially melted zone and heat-affected zone is mitigated when welding with the improved filler material. Even though, in this example, the melting zone is solely manipulated to contain nanoparticles, a manipulation of a melt zone's viscosity and thermal conductivity can alter the heat flow of the system.

An additional major advantage of the nano-treated AA7075 filler material becomes evident when comparing the microhardness results of the two samples after post-weld heat treatment (see Methods). Since the nanocomposite filler rod mimics the chemical composition of the base material, the melting zone becomes fully heat treatable and even exceeds the hardness level of the base material due to nanoparticle reinforcement. Furthermore, the pinning effect of the nanoparticles restricts grain growth within the melting zone during the heat treatment, yielding a grain size of 13±6.2 μm after heat treatment. In contrast, with ER5356 welded as v-groove, about 20% of the base material's strengthening alloying components are diluted into the melting zone. Therefore, the increase in hardness within the melting zone after heat treatment is much less significant.

To further investigate the applicability of this improved filler material, transversal tensile bars were cut from the weld joint and tested in as-welded and heat-treated condition. FIG. 5b shows a selection of welded higher strength aluminum alloys, as well as the results of the present example. For the as-welded case the tensile strength reached a maximum of about 392 MPa (average 376±15 MPa) at about 1.5% elongation, which is considerably higher than tensile properties using ER5356 as reported.

Although, considering its hardness, the partially melted zone would have been the designated fracture zone, with the specimen fractured within the melting zone. An improved mechanical performance can therefore be expected when welding defects are reduced and the overall welding parameters are optimized.

As already indicated by the cross-sectional microhardness, the merit of the nano-treated filler, regarding mechanical properties, becomes evident when heat-treating the tensile bars to T6 condition. Tensile testing of the heat-treated specimen reached about 551 MPa (average 531±19 MPa) tensile strength, which is within about 93% of AA7075-T6's wrought value, at about 5.21% elongation. It is remarkable that the specimen exhibiting the highest tensile properties fractured at the onset of the tensile bar's gauge, at great distance from melting and partially melted zones. This indicates that with heat treatment, the resulting fusion joint is possibly as strong as the original wrought material. A summary of transversal ultimate tensile strengths of nano-treated AA7075 welds compared to AA7075 welded with ER5356 filler material and other welded aluminum alloys can be found in FIG. 5b.

Conclusions:

In summary, an improved nano-treated AA7075 filler wire was utilized to disable the driving mechanisms of hot cracking for gas tungsten arc welding of AA7075. Here, the presence of TiC nanoparticles during solidification of a melting zone modified the alloy's α-grain and secondary phase morphology, yielding a crack-free fusion joint. The melting zone's grain morphology was quasi spherical and dendritic grain growth causing solidification cracking was eliminated. Transversal tensile bars cut from the fusion joints showed an extraordinary ultimate tensile strength of up to about 392 MPa in as-welded condition, while reaching up to about 551 MPa with post-weld heat treatment, which is about 96% of the wrought material's property. This method and introduced mechanisms provide an innovative pathway to fabricate filler wires which allow arc welding for other hard to weld material systems and have the potential to improve welding of dissimilar materials.

Methods:
Filler Rod Fabrication

TiC as reinforcement was chosen due to promising incorporation results and satisfactory particle-matrix (Aluminum as well as $Mg(Zn,Cu,Al)_2$ phase) lattice match. Aluminum and TiC can stably coexist above a temperature of about 750° C. Furthermore, the materials have good wettability ($\theta \approx 51°$ above 800° C. TiC particles of about 40-60 nm in diameter were used. A higher content of AA7075 in a melting pool can lead to higher as-welded strength and can increase the recovery effect of post-weld treatment. Therefore, and to showcase the effectiveness of nanoparticles to prevent hot cracking, the welding filler rods were designed as AA7075 containing about 1.7 vol. % of TiC.

To incorporate TiC into aluminum the method of flux assisted liquid state incorporation was chosen, due to its scalability. As flux, $KAlF_4$ was chosen. Aluminum/TiC nanocomposite containing about 8 vol. % TiC was fabricated as a master. Suitable amounts of aluminum (to dilute the master material's TiC content), zinc, copper, magnesium and chromium, to match the chemical composition of the AA7075 base material, were added to fabricate an AA7075 metal matrix nanocomposite containing about 1.7 vol. % of TiC. The composite was casted into billets and hot extruded to about 3.175 mm welding rods.

Energy-dispersive spectroscopy (EDS) analysis of ion-milled rod segments showed the alloying components were within reasonable proximity of AA7075's chemical composition, shown in Table 1.

TABLE 1

(values in terms of weight percentage)

|  | Mg | Cu | Zn | Cr | Al |
|---|---|---|---|---|---|
| AA7075 | 2.1-2.9 | 1.2-2 | 5.1-6.1 | 0.18-0.28 | bal |
| Nano-treated AA7075 | 3.2 | 1.2 | 6.4 | 0.15 | bal |

Welding Procedure

Welding experiments were conducted by fusing about 152.4 mm×about 76.2 mm×about 3.175 mm AA7075 sheets as butt weld with v-groove, clamped onto a copper backing plate. As a reference ER5356 as well as the improved AA7075 metal matrix nanocomposite filler rod in about 3.175 mm diameter were welded under equal parameters for power source (Lincoln Aspect 375) and welding robot, shown in Table 2.

TABLE 2

Welding parameters

| Parameter | Values |
|---|---|
| Type of current | Constant current |
| Current | 180 A |
| Output frequency | 180 Hz |
| Balance | 85% |
| Argon flow rate | 18 cc/min |
| Electrode gap | 2 mm |
| Electrode forward speed | 60 mm/min |
| Start delay | 1.5 s |

Sample Preparation

The fused AA7075 base plates were cut into transversal tensile bars using an AgieCharmilles CUT 200 wire EDM machine. The residual slugs were first ground by 400, 600, 800 and 1200 grinding paper and finally polished using about 1 μm $Al_2O_3$ compound for OM, SEM and Vicker's microhardness characterization. SEM samples were further ion milled. To enhance the visibility of grains and contrast when using polarized light the OM samples were additionally etched with Weck's reagent. For TEM characterization a sample of about 46 nm thickness was cut from the melting zone using Focused Ion Beam (FIB) and characterized with a Titan S/TEM (FEI) at about 300 kV.

Post-Weld Heat Treatment (PWHT)

The samples were subjected to heating at about 480° C. for about 1 h and then water quenched at about 25° C. In a second stage, the samples were aged at about 120° C. for about 19 h and then cooled to room temperature in air.

Vicker's Microhardness

Using polished, vertical, transversal cross-sections, the microhardness tests were conducted at about half of the base material's thickness using machine settings of about 200 g force and about 10 s dwell time.

Tensile Testing

The fused AA7075 base material plates were cut to tensile specimen (ASTM-E8 with reduced grip length) using a Georg Fisher AG cut 200 Wire EDM machine and were further polished. Tensile tests were conducted using an about 100 kN load cell and a test speed of about 1.27 mm per minute. Ultimate tensile strength (UTS) elongation was measured manually after removing the specimen from the tensile testing machine.

Differential Scanning Calorimetry (DSC)

About 44.63 mg and about 43.02 mg samples were cut from the melting zones welded with nano-treated and substantially pure AA7075 welding rods respectively and investigated using an Elmer Perkins DSC 8000. In alumina crucibles, the samples were heated from about 25° C. to about 670° C. at about 350° C./min, held at about 670° C. for about 10 minutes and then cooled to about 350° C. at about 10° C./min in order to observe the samples' heat flow within the semi solid zone. The baseline, obtained by running the program solely with alumina crucible, was subtracted and the resulting data was corrected for the mass difference.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is spherical or spheroidal can refer to a diameter of the object. In the case of an object that is non-spherical or non-spheroidal, a size of the object can refer to a diameter of a corresponding spherical or spheroidal object, where the corresponding spherical or spheroidal object exhibits or has a particular set of derivable or measurable properties that are substantially the same as those of the non-spherical or non-spheroidal object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "nanostructure" refers to an object that has at least one dimension in a range of about 1 nm to about 1000 nm. A nanostructure can have any of a wide variety of shapes, and can be formed of a wide variety of materials. Examples of nano structures include nanofibers, nanoplatelets, and nanoparticles.

As used herein, the term "nanoparticle" refers to a nanostructure that is generally or substantially spherical or spheroidal. Typically, each dimension of a nanoparticle is in a range of about 1 nm to about 1000 nm, and the nanoparticle has an aspect ratio of about 5 or less, such as about 3 or less, about 2 or less, or about 1.

As used herein, the term "nanofiber" refers to an elongated nanostructure. Typically, a nanofiber has a lateral dimension (e.g., a width) in a range of about 1 nm to about 1000 nm, a longitudinal dimension (e.g., a length) in a range of about 1 nm to about 1000 nm or greater than about 1000 nm, and an aspect ratio that is greater than about 5, such as about 10 or greater.

As used herein, the term "nanoplatelet" refers to a planar-like, nanostructure.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A metal matrix nanocomposite comprising:
   a matrix including an aluminum alloy, wherein the matrix includes aluminum as a majority component by weight, and at least one additional metal selected from zinc, magnesium, and copper;
   nanostructures dispersed in the matrix, wherein the nanostructures comprise titanium carbide or titanium boride; and
   a secondary phase comprising magnesium and at least one of zinc, copper, silicon, lithium, or aluminum,
   wherein the matrix includes grains having aspect ratios of 3 or less.

2. The nanocomposite of claim 1, wherein the grains have aspect ratios of 2.5 or less.

3. The nanocomposite of claim 1, wherein the nanostructures comprise titanium carbide.

4. The nanocomposite of claim 1, wherein the nanostructures comprise titanium boride.

5. The nanocomposite of claim 1, wherein the nanostructures are dispersed in the matrix at a volume fraction of up to 5% of the nanocomposite.

6. The nanocomposite of claim 5, wherein the volume fraction of the nanostructures in the nanocomposite is up to 3%.

7. The nanocomposite of claim 5, wherein the volume fraction of the nanostructures in the nanocomposite is up to 2.5%.

8. The nanocomposite of claim 1, wherein the secondary phase is eutectic.

9. The nanocomposite of claim 8, wherein at least one secondary phase feature size is at least 10 microns in at least one dimension.

10. The nanocomposite of claim 1, wherein the secondary phase comprises a 1:2 molar ratio of magnesium to zinc, copper, silicon, lithium, or aluminum.

* * * * *